US011232020B2

(12) United States Patent
Hicks et al.

(10) Patent No.: US 11,232,020 B2
(45) Date of Patent: Jan. 25, 2022

(54) FAULT DETECTION USING BREAKPOINT VALUE-BASED FINGERPRINTS OF FAILING REGRESSION TEST CASES

(71) Applicant: INTERNATIONAL BUSINESS MACHINES CORPORATION, Armonk, NY (US)

(72) Inventors: Andrew Hicks, Wappingers Falls, NY (US); Dale E. Blue, Poughkeepsie, NY (US); Ryan Thomas Rawlins, New Paltz, NY (US); Steven M. Partlow, Beacon, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 193 days.

(21) Appl. No.: 16/440,810

(22) Filed: Jun. 13, 2019

(65) Prior Publication Data

US 2020/0394127 A1 Dec. 17, 2020

(51) Int. Cl.
*G06F 11/00* (2006.01)
*G06F 11/36* (2006.01)

(52) U.S. Cl.
CPC ...... *G06F 11/3684* (2013.01); *G06F 11/3688* (2013.01); *G06F 11/3692* (2013.01)

(58) Field of Classification Search
CPC ............ G06F 11/3684; G06F 11/3688; G06F 11/3692; G06F 11/3604; G06F 11/3608;
(Continued)

(56) References Cited

U.S. PATENT DOCUMENTS 5,153,881 A  10/1992 Bruckert
5,185,877 A   2/1993 Bissei
(Continued)

FOREIGN PATENT DOCUMENTS

JP   H05282272 A   10/1993
JP   H07121498 A    5/1995
(Continued)

OTHER PUBLICATIONS

Ghandehari, Laleh Sh, Yu Lei, David Kung, Raghu Kacker, and Richard Kuhn. "Fault localization based on failure-inducing combinations." In 2013 IEEE 24th International Symposium on Software Reliability Engineering (ISSRE), pp. 168-177. IEEE, 2013. (Year: 2013).*

(Continued)

*Primary Examiner* — Anthony J Amoroso
(74) *Attorney, Agent, or Firm* — Cantor Colburn LLP; Teddi Maranzano

(57) ABSTRACT

Systems, methods, and computer-readable media are described for utilizing breakpoint value-based fingerprints of failing regression test cases to determine specific components of a System Under Test (SUT) that are causing a fault such as specific lines of source code. A failing test case from a regression run is selected and fault localization and inverse combinatorics techniques are employed to generate a set of failing test cases around the selected failing test case. A set of test fingerprints corresponding to the set of failing test cases is compared to a set of test fingerprints corresponding to a set of passing test cases to determine breakpoints that are indicated as being encountered during execution of at least one failing test case and that are not encountered during execution of any of the passing test cases. Specific lines of source code that correspond to these breakpoints are then identified as causing the fault.

20 Claims, 3 Drawing Sheets

(58) Field of Classification Search
CPC .............. G06F 11/3612; G06F 11/362; G06F 11/3624; G06F 11/3644; G06F 11/3668; G06F 11/3672; G06F 11/26; G06F 11/263; G06F 11/2653; G06F 11/277
See application file for complete search history.

(56) References Cited

U.S. PATENT DOCUMENTS

| | | | |
|---|---|---|---|
| 5,410,634 A | 4/1995 | Li | |
| 5,694,540 A | 12/1997 | Humelsine | |
| 5,758,061 A | 5/1998 | Plum | |
| 5,758,062 A | 5/1998 | Mcmahon | |
| 6,182,245 B1 | 1/2001 | Akin et al. | |
| 6,182,258 B1 | 1/2001 | Hollander | |
| 6,378,097 B1 | 4/2002 | Fin et al. | |
| 6,415,396 B1 | 7/2002 | Singh et al. | |
| 6,601,018 B1 | 7/2003 | Logan | |
| 6,718,286 B2 | 4/2004 | Rivin et al. | |
| 6,718,485 B1 | 4/2004 | Reiser | |
| 6,859,922 B1 | 2/2005 | Baker | |
| 6,907,546 B1 | 6/2005 | Haswell et al. | |
| 7,024,589 B2 | 4/2006 | Hartman et al. | |
| 7,032,212 B2 | 4/2006 | Amir et al. | |
| 7,093,238 B2 | 8/2006 | Givoni | |
| 7,178,063 B1 | 2/2007 | Smith | |
| 7,235,358 B2 | 6/2007 | Wohlgemuth | |
| 7,315,634 B2 | 1/2008 | Martin | |
| 7,363,495 B2 | 4/2008 | Wells | |
| 7,386,839 B1 | 6/2008 | Golender | |
| 7,552,425 B2 | 6/2009 | Bates et al. | |
| 7,596,778 B2 | 9/2009 | Kolawa | |
| 7,617,074 B2 | 11/2009 | Beish | |
| 7,640,470 B2 | 12/2009 | Lammel | |
| 7,721,265 B1 | 5/2010 | Xu | |
| 7,752,502 B2 | 7/2010 | Glee | |
| 7,861,226 B1 | 12/2010 | Episkopos | |
| 7,945,898 B1 | 5/2011 | Episkopos et al. | |
| 7,958,400 B2 | 6/2011 | Ur | |
| 7,962,798 B2 | 6/2011 | Locasto | |
| 8,056,060 B2 | 11/2011 | Bicheno | |
| 8,225,194 B2 | 7/2012 | Rechsteiner | |
| 8,234,105 B1 | 7/2012 | Aldrich | |
| 8,296,445 B1 | 10/2012 | Hackborn | |
| 8,296,605 B2 | 10/2012 | John | |
| 8,301,757 B2 | 10/2012 | Catlin | |
| 8,370,816 B2 | 2/2013 | Farchi et al. | |
| 8,479,171 B2 | 7/2013 | Ghosh | |
| 8,504,997 B2 | 8/2013 | Tkachuk et al. | |
| 8,527,813 B2 | 9/2013 | Budnik | |
| 8,549,480 B2 | 10/2013 | Cohen et al. | |
| 8,554,811 B2 | 10/2013 | Mariani | |
| 8,649,995 B2 | 2/2014 | Thulasidasan et al. | |
| 8,694,958 B1 | 4/2014 | Potter | |
| 8,756,460 B2 | 6/2014 | Blue et al. | |
| 8,775,886 B2 | 7/2014 | Mellen | |
| 8,806,450 B1 | 8/2014 | Maharana | |
| 8,813,033 B2* | 8/2014 | Sreedhar | G06F 11/3608 717/124 |
| 8,856,129 B2 | 10/2014 | Cai | |
| 8,935,673 B1 | 1/2015 | Ashkenazi | |
| 8,949,674 B2 | 2/2015 | Mancoridis | |
| 8,954,926 B2 | 2/2015 | Braun et al. | |
| 8,954,930 B2 | 2/2015 | Kamenz | |
| 8,966,453 B1 | 2/2015 | Zamfir | |
| 8,997,061 B1 | 3/2015 | Davison | |
| 9,009,538 B2* | 4/2015 | D'Alterio | G06F 11/3684 714/38.1 |
| 9,037,915 B2 | 5/2015 | D+3 Alterio | |
| 9,063,899 B2 | 6/2015 | Epstein | |
| 9,098,635 B2 | 8/2015 | Peri-Glass et al. | |
| 9,104,804 B2 | 8/2015 | Best | |
| 9,111,033 B2 | 8/2015 | Bates | |
| 9,141,520 B2 | 9/2015 | Zheng | |
| 9,202,005 B2 | 12/2015 | Goswami et al. | |
| 9,286,313 B1 | 3/2016 | Sharangpani | |
| 9,317,410 B2 | 4/2016 | Eilam et al. | |
| 9,336,122 B2 | 5/2016 | Kilzer et al. | |
| 9,454,466 B2 | 9/2016 | Ivrii et al. | |
| 9,489,289 B2 | 11/2016 | Hu | |
| 9,513,998 B2 | 12/2016 | Coronado | |
| 9,529,701 B2 | 12/2016 | Ekambaram et al. | |
| 9,600,241 B2 | 3/2017 | Shankar et al. | |
| 9,600,401 B1 | 3/2017 | Haischt et al. | |
| 9,600,403 B1 | 3/2017 | Raz | |
| 9,626,277 B2 | 4/2017 | Thangamani | |
| 9,720,766 B2 | 8/2017 | Lee | |
| 9,734,263 B2 | 8/2017 | Kohavi et al. | |
| 9,779,013 B2 | 10/2017 | Narayan et al. | |
| 9,857,959 B2 | 1/2018 | Dhawal | |
| 9,864,675 B2 | 1/2018 | Ug | |
| 9,916,414 B2 | 3/2018 | Jeong | |
| 9,990,272 B2 | 6/2018 | Cooper | |
| 9,996,452 B2 | 6/2018 | Cooper et al. | |
| 10,061,685 B1 | 8/2018 | White | |
| 10,073,763 B1 | 9/2018 | Raman | |
| 10,152,479 B1 | 12/2018 | Granstrom | |
| 10,235,277 B2* | 3/2019 | Herzig | G06F 11/3672 |
| 10,270,748 B2 | 4/2019 | Briceno et al. | |
| 10,282,274 B2* | 5/2019 | Mola | G06F 11/362 |
| 10,296,446 B2 | 5/2019 | D'Andrea et al. | |
| 10,338,993 B1 | 7/2019 | Lekivetz et al. | |
| 10,383,553 B1 | 8/2019 | Glenn | |
| 10,417,282 B1 | 9/2019 | Zuber | |
| 10,430,318 B1 | 10/2019 | Ansari | |
| 10,545,855 B1 | 1/2020 | Jayaswal | |
| 10,560,539 B1 | 2/2020 | Loch et al. | |
| 10,637,853 B2 | 4/2020 | Lindemann | |
| 10,713,151 B1 | 7/2020 | Zinger et al. | |
| 10,754,756 B2 | 8/2020 | Ocariza, Jr. et al. | |
| 10,776,464 B2 | 9/2020 | Wilson | |
| 2003/0233600 A1 | 12/2003 | Hartman | |
| 2004/0154001 A1 | 8/2004 | Haghighat et al. | |
| 2006/0070048 A1 | 3/2006 | Li et al. | |
| 2006/0179386 A1 | 8/2006 | Pushpavanam | |
| 2008/0065931 A1* | 3/2008 | Coulter | G06F 11/261 714/37 |
| 2008/0148236 A1 | 6/2008 | Huang et al. | |
| 2008/0163165 A1 | 7/2008 | Shitrit | |
| 2008/0172652 A1 | 7/2008 | Davia et al. | |
| 2009/0249123 A1 | 10/2009 | Chow | |
| 2010/0023928 A1 | 1/2010 | Hentschel et al. | |
| 2010/0064190 A1 | 3/2010 | Ward et al. | |
| 2010/0100871 A1 | 4/2010 | Celeskey | |
| 2010/0287534 A1 | 11/2010 | Vangala et al. | |
| 2011/0016457 A1 | 1/2011 | Artzi et al. | |
| 2011/0145653 A1 | 6/2011 | Broadfoot | |
| 2012/0191443 A1 | 7/2012 | Amalfitano | |
| 2012/0253728 A1 | 10/2012 | Chamas | |
| 2012/0260132 A1 | 10/2012 | Blue | |
| 2013/0103983 A1 | 4/2013 | Tzoref-Brill et al. | |
| 2013/0125090 A1 | 5/2013 | Durand et al. | |
| 2013/0152047 A1 | 6/2013 | Moorthi | |
| 2014/0013307 A1 | 1/2014 | Hansson | |
| 2014/0059081 A1 | 2/2014 | Farchi et al. | |
| 2014/0095933 A1 | 4/2014 | Griesinger | |
| 2014/0372083 A1 | 12/2014 | Hsu et al. | |
| 2015/0094997 A1 | 4/2015 | Ivrii et al. | |
| 2015/0106653 A1 | 4/2015 | Adler et al. | |
| 2015/0378879 A1 | 12/2015 | Ding | |
| 2016/0140027 A1 | 5/2016 | Ug | |
| 2016/0305853 A1 | 10/2016 | Senf | |
| 2016/0378618 A1 | 12/2016 | Cmielowski et al. | |
| 2017/0060734 A1 | 3/2017 | Raz et al. | |
| 2017/0083429 A1 | 3/2017 | Pekelis et al. | |
| 2017/0103013 A1 | 4/2017 | Grechanik | |
| 2017/0132119 A1 | 5/2017 | Xu et al. | |
| 2017/0199810 A1 | 7/2017 | Hamilton | |
| 2017/0220800 A1 | 8/2017 | Niemela | |
| 2017/0262361 A1 | 9/2017 | Francis | |
| 2017/0270035 A1 | 9/2017 | Nie | |
| 2018/0024911 A1 | 1/2018 | Kruszewski et al. | |
| 2018/0052725 A1 | 2/2018 | Hannson | |
| 2018/0095867 A1 | 4/2018 | Varadarajan et al. | |
| 2018/0121336 A1 | 5/2018 | Ayyappan et al. | |

(56) References Cited

U.S. PATENT DOCUMENTS

| | | |
|---|---|---|
| 2018/0293156 A1 | 10/2018 | Zeng |
| 2018/0300226 A1 | 10/2018 | Manolios |
| 2018/0314577 A1 | 11/2018 | Gorjiara et al. |
| 2018/0329807 A1 | 11/2018 | Atyam |
| 2019/0018761 A1 | 1/2019 | Ramraz |
| 2019/0332523 A1 | 10/2019 | Gefen |
| 2019/0334807 A1 | 10/2019 | Clark et al. |
| 2019/0370274 A1 | 12/2019 | Yokoyama |
| 2020/0201741 A1* | 6/2020 | Saha .................. G06F 8/73 |
| 2020/0201822 A1 | 6/2020 | Wang |
| 2020/0213199 A1 | 7/2020 | Sethi |
| 2021/0156911 A1 | 5/2021 | Motika et al. |

FOREIGN PATENT DOCUMENTS

| | | |
|---|---|---|
| JP | H07139507 A | 5/1995 |
| WO | 2016138953 A1 | 9/2016 |
| WO | 2018162048 A1 | 9/2018 |

OTHER PUBLICATIONS

Brumley, David, Juan Caballero, Zhenkai Liang, James Newsome, and Dawn Song. "Towards Automatic Discovery of Deviations in Binary Implementations with Applications to Error Detection and Fingerprint Generation." In USENIX Security Symposium, p. 15. 2007. (Year: 2007).*

Fang, Zheng Felix, and Patrick Lam. "Identifying test refactoring candidates with assertion fingerprints." In Proceedings of the Principles and Practices of Programming on The Java Platform, pp. 125-137. 2015. (Year: 2015).*

Anonymously Disclosed. "A system and method for selling breakpoints automatically by comparing correct and incorrect runs". IP.com No. IPCOM000252399D, Publication Date: Jan. 8, 2018, 5 pages. (Year: 2018).*

Andalib et al., "A Novel Key Generation Scheme for Biometric Cryptosystems Using Fingerprint Minutiae," IEEE, pp. 1-6 (Year: 2013).

Anonymous, "Combining Combinatorial Models while Maintaining Full Coverage," Jun. 25, 2016, 5 Pages.

Anonymous, "Explaining a Combinatorial Test Plan Using Hole Analysis" May 20, 2012; 4 pages.

Anonymous, "Integration of Combinatorial Testing Design with Automated Testing to Develop Smart Automated Test Suites," Jan. 6, 2015, 3 pages.

Anonymous, "Method and System for Optimizing Combinatorial Test Design (CTD) to Test a Mobile Application in Different Devices," Feb. 10, 2015, 2 pages.

Anonymously Disclosed "Method to enable debugger breakpoint inside statement", IP.com No. IPCOM000206941D, Publication Date: May 13, 2011, 8 pages.

Anonymously Disclosed "System and method for improved regression failure analysis and easier debugging of test failures", IP.com No. IPCOM000209599D, Publication Date: Aug. 10, 2011, 6 pages.

Biswas, "Network-on-Chip Intellectual Property Protection Using Circular Path-based Fingerprinting," ACM, pp. 1-22 (Year: 2020).

Bromme et al., "A Conceptual Framework for Testing Biometric Algorithms within Operating Systems' Authentication", ACM, pp. 273-280 (Year: 2002).

Bryant et al., "Verification of Arithmetic Circuits with Binary Moment Diagrams," Proceedings of the 32nd ACM/IEEE design automation conference, 535-541, 1995.

Bures et al., "Tapir: Automation Support of Exploratory Testing Using Model Reconstruction of the System Under Test," IEEE, pp. 557-580 (Year: 2018).

Chakrabarti et al., "Specification Based Regression Testing Using Explicit State Space Enumeration," IEEE, pp. 1-6 (Year: 2006).

Chua, "Resistance switching memories are memristors," Applied Physics A, vol. 102, No. 4, 2011, pp. 765-783.

Esmaeili et al., "A Robust and Fast Video Copy Detection System Using Content-Based Fingerprinting," pp. 213-226 (Year: 2011).

Fang et al., "Identifying Test Refactoring Candidates with Assertion Fingerprinls," ACM, pp. 125-137 (Year: 2015).

Fujita et al., "Multi-Terminal Binary Decision Diagrams: An Efficient Data Structure for Matrix Representation," Formal Methods in System Design—FMSD, vol. 10, No. 2/3, pp. 149-169, 1997.

Giugno et al., "GraphGrep: A Fast and Universal Method for Querying Graphs," IEEE, pp. 112-115 (Year: 2002).

Graves et al., "An empirical study of regression test selection techniques," ACM Trans. Softw. Eng. Methodol., 184-208 (2001).

Grindal et al., "Combination testing strategies: a survey," Softw. Test. Verif. Reliab. 15(3), 167-199 (2005).

Gu et al., "Multi-Aspect, Robust, and Memory Exclusive Guest OS Fingerprinting," IEEE, pp. 380-394 (Year 2014).

Jain et al., "Fingerprint Matching," IEEE, pp. 36-44 (Year: 2010).

Kuhn, Rick "Introduction to Combinatorial Testing", NIST, Carnegie-Mellon University, Jun. 7, 2011, 48 pages.

Lehmann et al., "A Generic Systolic Array Building Block for Neural Networks with On-Chip Learning," IEEE Transactions on Neural Networks, vol. 4., No. 3,1993, pp. 400-407.

Li et al., "Training itself: Mixed-signal training acceleration for memristor-based neural network," 19th Asia and South Pacific Design Automation Conference (ASP-DAC), 2014, pp. 361-366.

Maughan, C., "Test Case Generation Using Combinatorial Based Coverage for Rich Web Applications," 2012.

Memon, Atif M., and Qing Xie. "Studying the fault-detection effectiveness of GUI test cases for rapidly evolving software." IEEE transactions on software engineering 31.10 (2005): pp. 884-896. (Year: 2005).

Mishchenko, A., "An Inkroduction to Zero-Suppressed Binary Decision Diagrams," Proceedings of the 12th Symposium on the Integration of Symbolic Computation and Mechanized Reasoning, 2001.

Orso, A. et al., "Scaling regression testing to large software systems," ACM Bigsoft Software Engineering Notes 29.6 (2004); pp. 241-251. (Year: 2004).

Pershin et al., "Solving mazes with memristors: A massively parallel approach," Physical Review E, vol. 84, No. 4, 2011, 046703, 6 pages.

Ratha et al., "A Real-Time Matching System for Large Fingerprint Databases," IEEE, pp. 799-813 (Year: 1996).

Rothermel et al., "Analyzing Regression Test Selection Techniques", IEEE, pp. 529-551 (Year: 1996).

Shu et al., "Testing Security Properties of Protocol Implementations—a Machine Learning Based Approach," IEEE, pp. 1-8 (Year 2007).

Snelick et al., "Multimodal Biometrics: Issues in Design and Testing," ACM, pp. 68-72 (Year: 2003).

Soudry et al., "Memristor-Based Multilayer Neural Networks With Online Gradient Descent Training," IEEE Transactions On Neural Networks and Learning Systems, 2015.

Taneja, Kunal, et al. "eXpress: guided path exploration for efficient regression test generation." Proceedings of the 2011 International Symposium on Software Testing and Analysis. 2011. pp. 1-11 (Year: 2011).

Tsai et al., "Adaptive-Scenario-Based Object-Oriented Test Frameworks for Testing Embedded Systems," IEEE, pp. 1-16 (Year: 2002).

Tsai et al., "Scenario-Based Object-Oriented Test Frameworks for Testing Distributed Systems," IEEE, pp. 1-7 (Year: 2000).

Wikipedia "All pairs testing" retrieved from https://web.archive.org/web/20180317245446/https://en.wikipedia.org/wik/all-pairs_testing (Year: 2018).

Wikipedia "Cartesian Product" web page, from date Jan. 15, 2019, retrieved from https://web.archive.org/web/20190115231627/https://en.wikipedia.org/wiki/Cartesian_product (Year: 2019).

Wilmor, D. et al, "A safe regression test selection technique for database-driven applications." 21st IEEE International Conference on Software Maintenance (ICSM'05). IEEE, 2005, pp. 1-10 (Year: 2005).

(56) References Cited

OTHER PUBLICATIONS

Yi, Q. et al., "A synergistic analysis method for explaining failed regression tests," 2015 IEEE/ACM 37th IEEE International Conference on Software Engineering. vol. 1. IEEE, 2015 pp. 257-267 (Year: 2015).
Zhong et al., "TestSage: Regression Test Selection for Large-scale Web Service Testing," IEEE, pp. 430-440 (Year: 2019).
Anonymous, "A Method and System for Providing Collaborative Platform as a Service for Aiding Machine Learning Development," IP.com (IPCOM000256095D). Nov. 2, 2018. 5 pages.
Anonymous, "Black Hole Testing—Machine Learning Program Behavior Patterns from Massive Automated Test Results," IP.com (IPCOM000243987D). Nov. 4, 2015. 8 pages.
Anonymously Disclosed "A system and method for setting breakpoints automatically by comparing correct and incorrect runs" IP.com No. IPCOM000252399D, Publication Date: Jan. 8, 2018, 5 pages.
Anonymously Disclosed "Advanced Interrogative Debugger for data-centric domain", IP.com No. IPCOM000226865D, Publication Date: Apr. 23, 2013, 14 pages.
Anonymously Disclosed "Cognitive, Self-Instrumenting Code on Detection of an Issue" IP.com No. IPCOM000253277D; Publication Date: Mar. 19, 2018; 4 pgs.
Anonymously Disclosed "Method and system to find potential program defect based on run-time variable change analysis", IP.com No. IPCOM000248699D, Publication Date: Dec. 28, 2016, 8 pages.
Anonymously Disclosed "Method for a debugging tool for finding variable value in application stack", IP.com No. IPCOM000209789D, Publication Date: Aug. 15, 2011, 5 pages.
Anonymously Disclosed "Simple Automated Code Coverage Method for test metrics", IP.com No. IPCOM000201864D, Publication Date: Nov. 29, 2010, 6 pages.
Anonymously Disclosed "Structured enhanced breakpoint chain", IP.com No. IPCOM000244264D, Publication Date: Nov. 27, 2015, 4 pages.
Astigarraga, Tara "IBM Test Overview and Best Practices", IBM, Nov. 2012, pp. 1-53.
Cohen, D. M. et al., "The AETG system: An approach to testing based on combinatorial design." IEEE Transactions on Software Engineering, 23(7), pp. 437-444. Jul. 1997.
Compuware Corporation "Validate Testing Thoroughness and Provide Application Analysis", 2014, 4 pages.
De Souza et al., "Spectrum-based Software Fault Localization: A Survey of Techniques, Advances and Challenges" Dept, of Computer Science—University of Sao Paulo; arXiv:1607.04347v2 [cs. SE]; Nov. 26, 2017, 46 pages.
Devai, Gergely et al., "UML Model Execution via Code Generation" Eotvos Lorand University, Faculty of Informatics, Budapest, Hungary 2017, pp. 9-15.
Hicks et al., "Champion Test Case Generation", U.S. Appl. No. 16/256,949, filed Jan. 24, 2019.
Hicks et al., "Combinatoric Set Completion Through Unique Test Case Generation", U.S. Appl. No. 16/256,394, filed Jan. 24, 2019.
Hicks et al., "Fault Detection and Localization Using Combinatorial Test Design Techniques While Adhering to Archtiectural", U.S. Appl. No. 16/256,391, filed Jan. 24, 2019.
Hicks et al., "Reduction of Test Infrastructure", U.S. Appl. No. 16/440,781, filed Jun. 13, 2019.
Hicks et al., "Self Healing Software Utilizing Regression Test Fingerprints", U.S. Appl. No. 16/440,833, filed Jun. 13, 2019.
Hicks et al., "Test Space Analysis Across Multiple Combinatoric Models", U.S. Appl. No. 16/256,388, filed Jan. 24, 2019.
Hicks et al., "Associating Attribute Seeds of Regression Test Cases With Breakpoint Value-Based Fingerprints," U.S. Appl. No. 16/440,857, filed Jun. 13, 2019.
Hicks et al., "Breakpoint Value-Based Version Control," U.S. Appl. No. 16/440,800, filed Jun. 13, 2019.
Hicks et al., "Customizable Test Set Selection Using Code Flow Trees," U.S. Appl. No. 16/440,751, filed Jun. 13, 2019.
Hicks et al., "Fault Detection and Localization to Generate Failing Test Cases Using Combinatorial Test Design Techniques", U.S. Appl. No. 16/256,388, filed Jan. 24, 2019.
Hicks et al., "Regression Test Fingerprints Based on Breakpoint Values," U.S. Appl. No. 16/440,404, filed Jun. 13, 2019.
IBM "Assuring Software Quality by Automatic Generation of Test Cases and Automatic Analysis of Test Case Results for Derivation and Regression Error Determination" IP.com No. IPCOM000180300D; Publication Date Mar. 6, 2009; 6 pgs.
IBM, "InspectioN Testing Using Debugging Capabilities to Allow Combinational Testing", IP.com No. IPCOM000188370D, Electronic Publication Date: Oct. 2, 2009, 3 pages.
IBM, "Tool and Strategy for testing and validating software components at the source code level", IP.com No. IPCOM000180330D, Publication Date: Mar. 6, 2009, 3 pages.
IBM, Method of preventing build failures by searching through levels in a multi-level revision collrol system IP.com No. IPCOM000179779D, Publication Date: Feb. 25, 2009, 3 pages.
Koch, Gemot et al., "Breakpoints and Breakpoint Detection in Source Level Emulation", Forschungszentrum Informatik (FZI), Haid-und-Neu-Strabe 10-14, D 76131 Karlsruhe, DE; University of Tübingen, Sand 13, D 72076 Tübingen, DE, 2017, 6 pages.
Kuhn, Rick "Introduction to Combinatorial Testing", NIST, Carnegie-Mellon University, Jun. 7, 2011, 48 pages.
Leon et al., "An empirical evaluation of test case filtering techniques based on exercising complex information flows," Proceedings of the 27th International Conference on Software Engineering, pp. 412-421. ACM, 2005.
Kamalakar, Sunil, "Automatically Generating Tests from Natural Language Descriptions of Software Behavior," Virginia Polytechic Institute and State University, Sep. 23, 2013. 72 pages.
List of IBM Patents or Patent Applications Treated as Related; Date Filed: Jul. 19, 2019, 2 pages.
Mathur et al., "Adaptive Automation: Leveraging Machine Learning to Support Uninterrupted Automated Testing of Software Applications" arXiv.org, Aug. 4, 2015. 6 pages.
Nguyen et al., "Combining model-based and combinatorial testing for effective test case generation," Proceedings of the 2012 International Symposium on Software Testing and Analysis, Jul. 15-20, 2012. pp. 100-110.
Petke, J. et al., "Efficiency and early fault detection with lower and higher strength combinatorial interaction testing". In Proceedings of the 2013 9th Joint Meeting on Foundations of Software Engineering, pp. 26-36. Aug. 18-26, 2013.
Segall "Combinatorial Test Design" IBM Haifa Research Labs, 2012, pp. 1-49.
Shakya, K. & Xie, T., "Isolating Failure-Inducing Combinations in Combinatorial Testing using Test Augmentation and Classification", CT 2012 workshop, (23 pages).
Soffa, Mary Lou et al. Exploiting Hardware Advances for Software Testing and Debugging (NIER Track) ICSE '11; May 21-28, 2011; 4 pgs.
Yilmaz et al., "Moving forward with combinatorial interaction testing," Computer, 47(2). Feb. 2014. pp. 37-45.

* cited by examiner

FAULT DETECTION USING BREAKPOINT VALUE-BASED FINGERPRINTS OF FAILING REGRESSION TEST CASES

RELATED APPLICATIONS

This application which claims the benefits of multiple legally related applications including Application titled "FAULT DETECTION AND LOCALIZATION TO GENERATE FAILING TEST CASES USING COMBINATORIAL TEST DESIGN TECHNIQUES" assigned Ser. No. 16/256,388, filed Jan. 24, 2019; Application titled "FAULT DETECTION AND LOCALIZATION USING COMBINATORIAL TEST DESIGN TECHNIQUES WHILE ADHERING TO ARCHITECTURAL RESTRICTIONS" assigned Ser. No. 16/256,391, filed Jan. 24, 2019; Application titled "COMBINATORIC SET COMPLETION THROUGH UNIQUE TEST CASE GENERATION" assigned Ser. No. 16/256,394, filed Jan. 24, 2019; Application titled "TEST SPACE ANALYSIS ACROSS MULTIPLE COMBINATORIC MODELS" assigned Ser. No. 16/256,179, filed Jan. 24, 2019; Application titled "CHAMPION TESTCASE GENERATION" assigned Ser. No. 16/256,949, filed Jan. 24, 2019; Application titled "REGRESSION TEST FINGERPRINTS BASED ON BREAKPOINT VALUES," assigned Ser. No. 16/440,404, filed Jun. 13, 2019; Application titled "SELF HEALING SOFTWARE UTILIZING REGRESSION TEST FINGERPRINTS," Ser. No. 16/440,833, filed Jun. 13, 2019; Application titled "REDUCTION OF TEST INFRASTRUCTURE," Ser. No. 16/440,781, filed Jun. 13, 2019; Application titled "BREAKPOINT VALUE-BASED VERSION CONTROL," Ser. No. 16/440,800, filed Jun. 13, 2019; Application titled "CUSTOMIZABLE TEST SET SELECTION USING CODE FLOW TREES," Ser. No. 16/440,751, filed Jun. 13, 2019; and Application titled "ASSOCIATING ATTRIBUTE SEEDS OF REGRESSION TEST CASES WITH BREAKPOINT VALUE-BASED FINGERPRINTS," Ser. No. 16/440,857, filed Jun. 13, 2019, with all the benefits accruing therefrom, the contents of which in its entirety are herein incorporated by reference.

BACKGROUND

The present invention relates generally to regression testing, and more particularly, to fault detection that utilizes breakpoint value-based fingerprints of failing regression test cases to pinpoint specific components of a System Under Test (SUT) that are causing a fault such as specific lines of source code.

Breakpoints are intentional stopping or pausing points in a program, typically inserted for the purposes of debugging. More generally, a breakpoint is a means of acquiring knowledge about a program's execution. When a breakpoint is reached during execution, a test environment (e.g., general purpose registers, memory, logs, files, etc.) to attempt to determine whether the program is functioning as expected. Breakpoints are commonly used to interrupt a running program immediately before execution of particular program instructions, in which case, they may be referred to as instruction breakpoints.

Combinatorial Test Design (CTD) is a testing methodology that seeks to increase test space coverage for a System Under Test (SUT) through the use of automated algorithms. These algorithms identify input patterns that are most likely to locate problems in the SUT, thereby reducing the amount of time required for a tester to build test cases and an automation framework. CTD is well-adapted for projects that require numerous variations on static input vectors to properly test various system states and logic pathways, which would otherwise be extremely cumbersome for a human tester.

CTD provides enhanced testing efficiency over manual testing through the use of automated algorithms. CTD methodologies, however, still suffer from a number of technical drawbacks, technical solutions to which are described herein.

SUMMARY

In one or more example embodiments, a method for performing fault detection is disclosed. The method includes executing a set of test cases on source code and determining that one or more test cases in the set of test cases fail to successfully execute. A particular failing test case is then selected from the one or more test cases that fail to successfully execute and a set of failing cases is generated from the particular failing test case. The method further includes determining a first set of fingerprints respectively corresponding to the set of failing test cases and determining a second set of fingerprints respectively corresponding to a set of passing test cases that successfully execute on the source code. The first set of fingerprints is then compared to the second set of fingerprints to determine one or more lines of the source code that are contributing to a fault.

In one or more other exemplary embodiments, a system for performing fault detection is disclosed. The system includes at least one memory storing computer-executable instructions and at least one processor configured to access the at least one memory and execute the computer-executable instructions to perform a set of operations. The operations include executing a set of test cases on source code and determining that one or more test cases in the set of test cases fail to successfully execute. A particular failing test case is then selected from the one or more test cases that fail to successfully execute and a set of failing cases is determined based on the particular failing test case. The operations further include determining a first set of fingerprints respectively corresponding to the set of failing test cases and determining a second set of fingerprints respectively corresponding to a set of passing test cases that successfully execute on the source code. The first set of fingerprints is then compared to the second set of fingerprints to determine one or more lines of the source code that are contributing to a fault.

In one or more other exemplary embodiments, a computer program product for performing fault detection is disclosed. The computer program product includes a computer readable storage medium having program instructions embodied therewith. The program instructions are executable by a processing circuit to cause the processing circuit to perform a method. The method includes executing a set of test cases on source code and determining that one or more test cases in the set of test cases fail to successfully execute. A particular failing test case is then selected from the one or more test cases that fail to successfully execute and a set of failing cases is determined based on the particular failing test case. The method further includes determining a first set of fingerprints respectively corresponding to the set of failing test cases and determining a second set of fingerprints respectively corresponding to a set of passing test cases that successfully execute on the source code. The first set of fingerprints is then compared to the second set of fingerprints to determine one or more lines of the source code that are contributing to a fault.

BRIEF DESCRIPTION OF THE DRAWINGS

The detailed description is set forth with reference to the accompanying drawings. The drawings are provided for purposes of illustration only and merely depict exemplary embodiments of the invention. The drawings are provided to facilitate understanding of the invention and shall not be deemed to limit the breadth, scope, or applicability of the invention. In the drawings, the left-most digit(s) of a reference numeral identifies the drawing in which the reference numeral first appears. The use of the same reference numerals indicates similar, but not necessarily the same or identical components. However, different reference numerals may be used to identify similar components as well. Various embodiments may utilize elements or components other than those illustrated in the drawings, and some elements and/or components may not be present in various embodiments. The use of singular terminology to describe a component or element may, depending on the context, encompass a plural number of such components or elements and vice versa.

DETAILED DESCRIPTION

Figure 1:
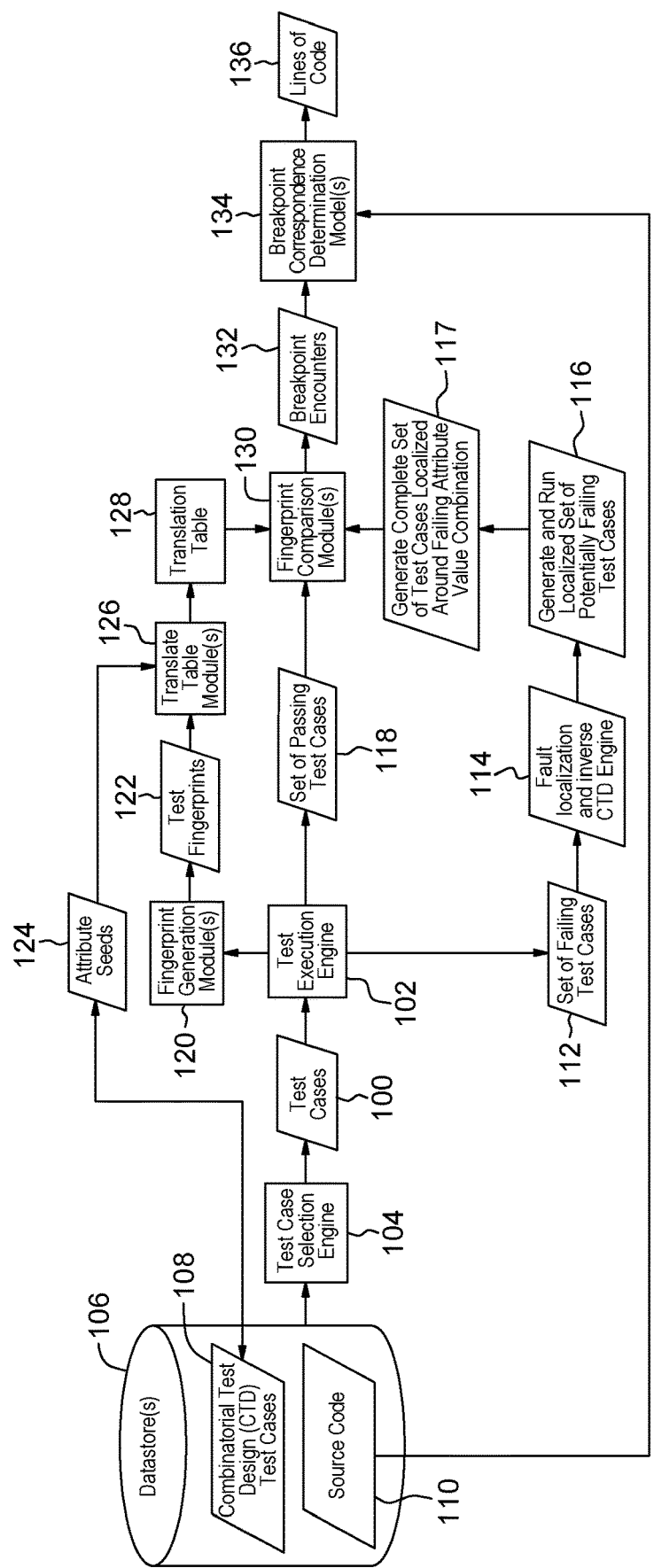
FIG. 1 is a schematic hybrid data flow/block diagram illustrating fault detection utilizing breakpoint value-based fingerprints of failing regression test cases to determine specific lines of source code that are causing a fault in accordance with one or more example embodiments of the invention.

Example embodiments of the invention relate to, among other things, devices, systems, methods, computer-readable media, techniques, and methodologies for utilizing breakpoint value-based fingerprints of failing regression test cases to determine specific components of a System Under Test (SUT) that are causing a fault. While example embodiments may be described herein with respect to SUTs that are software systems such as a body of source code—in which case specific lines of the source code causing a fault may be determined—it should be appreciated that the SUT may be a hardware system or a collection of hardware logic as well. Further, certain terminology used herein to describe a collection of elements, a type of data structure, or the like are not intended to be limiting in any way and are intended to encompass any variation or alternative that achieves the same function. For instance, reference made herein to a test vector or some variation thereof is not intended to limit embodiments of the invention to any particular type of data structure for representing a test vector. The combination of attribute values represented by a test vector can be stored/represented using any suitable type of data structure. As another example, the terms set, group, collection, and the like are used interchangeably herein to connote any collection of elements that may or may not be ordered. In addition, while example embodiments may be described herein in connection with a translation table for storing associations between attribute seeds of test cases and corresponding test fingerprints, it should be appreciated that the translation table may be a database, repository, or any other organized storage area.

In example embodiments, a set of regression test cases may be executed on a body of source code. The set of regression test cases may be, for example, a reduced set of CTD test cases that provide the desired amount of coverage of a test space or some subset thereof. In particular, inputs to a SUT such as a body of source code can be modeled as a collection of attributes, each of which is capable of taking on a respective one or more attribute values. CTD techniques may be employed to generate CTD test vectors, where each CTD test vector is representative of a particular combination of attribute values. A corresponding test case may be generated for each such CTD vector that tests the particular combination of attribute values embodied by the CTD vector.

Generally speaking, it is infeasible to execute within any reasonable constraint (e.g., time constraint) the total number of CTD test cases required to provide complete coverage of an entire Cartesian product test space (i.e., test all possible combinations of attribute values). Thus, in example embodiments, the set of test cases selected for execution may be a reduced set of test cases that provides complete n-wise coverage of a test space but only partial higher-order coverage. A set of test cases that provides complete n-wise coverage includes all possible n-way combinations of attribute values, but only partially covers all possible m-way combinations of attribute values, where m>n. For a given set of test cases, as m increases, the amount of partial m-way coverage provided by the set of test cases may decrease.

In example embodiments, a code path may be traversed during execution of a test case. A collection of breakpoints may be encountered during traversal of the code path. Breakpoints are points in the execution of source code that occur before or after one or more lines of source code and that can halt execution of the program or trigger specific tools. In example embodiments, as a test case is executed, the corresponding code path that is traversed may result in multiple breakpoints being encountered, one or more of which may be encountered multiple times. A code path, as used herein, refers to a path traversed during execution of at least a portion of source code and may indicate a number of times each breakpoint is encountered, and potentially, an order in which such breakpoints are encountered during execution.

In example embodiments, a test fingerprint may be generated that is indicative of each breakpoint encountered as part of traversal of a code path during execution of a test case. The test fingerprint may be further indicative of a number of times each such breakpoint is encountered as well as, potentially, an order in which the breakpoint encounters occur. Various algorithms may be employed to generate a test fingerprint for a test case based on breakpoints encountered during execution of the test case. Such algorithms are described in co-pending application entitled "Regression Test Fingerprints Based on Breakpoint Values."

Regardless of the particular algorithm employed to generate a test fingerprint, the fingerprint may be reversible to ascertain which breakpoints were encountered during execution of the test case to which the fingerprint corresponds and a respective number of times each such breakpoint was encountered. Further, in example embodiments, certain fingerprint generation algorithms may generate a test fingerprint that is reversible to further determine an order in which the breakpoint encounters occurred. More specifically, in example embodiments, a test fingerprint may be a data structure that is indexed with respect to the breakpoints present in a SUT. For instance, each element of a test fingerprint may correspond to a particular breakpoint. In example embodiments, a nonzero value (e.g., a value greater than zero) at a particular indexed location in the test fingerprint may indicate that the breakpoint that corresponds to that indexed location was encountered during execution of the corresponding test case. Further, in example embodiments, any such nonzero value in a test fingerprint may be reflective of and potentially broken down into constituent breakpoint values that may be indicative of a number of times a corresponding breakpoint was encountered, and potentially, an order in which the breakpoint was encountered. In other example embodiments, a test fingerprint may be a character string, where each character in the string represents a corresponding breakpoint and the ordering of the characters in the string represents an order in which the breakpoints are encountered.

In example embodiments, a translation table may be populated with entries that associate test cases with their corresponding test fingerprints. In example embodiments, each translation table entry may store an attribute seed of a corresponding test case in association with the test fingerprint for that test case. The attribute seed may be a representation of the combination of attribute values tested by the test case. In example embodiments, the translation table may be indexed by attribute seed such that an attribute seed may be used to search the translation table for a corresponding test fingerprint. Once identified from the translation table, a stored test fingerprint may be retrieved and deconstructed to obtain the corresponding collection of breakpoints encountered during execution of a corresponding test case.

In example embodiments, execution of the selected test cases, which as noted earlier, may be a reduced set of CTD test cases that provides complete n-way coverage of a test space may result in one or more selected test cases failing to successfully execute on the source code. In example embodiments, a particular failing test case may be selected and a fault localization and inverse combinatorics technique, such as those described in co-pending application entitled "Fault Detection and Localization to Generate Failing Test Cases Using Combinatorial Test Design Techniques," may be employed to expand out a set of test cases from the particular selected failing test case; execute the set of cases to localize the error; and generate a regression bucket of failing test cases around the localized error.

Stated generally, in example embodiments, application of inverse combinatorics to the selected failing test case includes generating a respective new test case with respect to each attribute in the test case. Thus, the number of new test cases generated may be equal to the number of attributes. In example embodiments, in each new test case, the attribute value of a corresponding attribute in the selected failing test case is changed to an attribute value for that attribute that is not present in any failing test case and the respective attribute value for each other attribute is unchanged from that which is present in the selected failing test case. This expanded new set of test cases is then executed.

Those new test case(s) that yield a successful execution result may then be assessed to detect and localize the n-wise (or m-wise where m<n) error. In particular, the specific combination of attribute values that are causing the error may be identified based on those new test cases that successfully execute. A set of likely to fail test cases may then be generated based on the error-producing combination of attribute values. More specifically, every possible combination of attribute values that include the particular combination of attribute values determined to cause the error may be determined and a regression bucket of corresponding failing test cases for testing each such combination of attribute values may be generated. In particular, in example embodiments, all test cases contained in the regression bucket will fail when executed until the error is fixed, after which all regression bucket test cases should pass (i.e., produce a successful execution result).

In example embodiments, the first set of test fingerprints corresponding to the set of likely to fail test cases generated using a fault localization and inverse combinatorics technique as described above may be determined. In addition, a second set of test fingerprints corresponding to a set of passing test cases that successfully execute may be determined. The first set of test fingerprints and the second set of test fingerprints may be determined by using attribute seeds representative of the combinations of attribute values tested by the set of likely to fail test cases and attribute seeds representative of the combinations of attribute values tested by the set of passing test cases, respectively, to access the translation table and determine the corresponding test fingerprints (or identifiers thereof) that are stored in association with the attribute seeds. In certain example embodiments, test fingerprint(s) for one or more of the failing test cases may not have been previously generated and stored in the translation table. As such, in example embodiments, it may be necessary to execute one or more of the failing test cases on the source code to determine corresponding test fingerprint(s). In addition, in example embodiments, the set of passing test cases may be selected from those test cases initially selected for execution and/or from other stored CTD test cases.

In example embodiments, the first set of fingerprints corresponding to the set of likely to fail test cases and the second set of fingerprints corresponding to the set of passing test cases may be compared to determine one or more breakpoint encounters that are present in at least one fingerprint in the first set of fingerprints and absent from each fingerprint in the second set of fingerprints. In example embodiments, this determination may be made by first evaluating each fingerprint in the first set of fingerprints to determine a corresponding collection of breakpoint encounters embodied in each such fingerprint. Each fingerprint in the second set of fingerprints may be similarly deconstructed to determine a corresponding collection of breakpoints embodied therein. The respective collection of breakpoints embodied in each fingerprint corresponding to a failing test case may then be compared to each respective collection of breakpoints corresponding to a passing test case to identify one or more breakpoints that are encountered during execution of at least one failing test case (as reflected in corresponding test fingerprint(s)) and that are not encountered during execution of any of the passing test cases.

In example embodiments, a breakpoint that is encountered during execution of at least one failing test case and which is not encountered during execution of any passing test case corresponds to one or more lines of source code that are executed in at least one failing test case scenario but not executed in any passing test case scenario. In particular, the lines of source code corresponding to particular breakpoints may be determined based on a predefined association there between. As such, in example embodiments, the breakpoint(s) present in at least one fingerprint in the first set of fingerprints corresponding to the set of likely to fail test cases and absent from any fingerprint in the second set of fingerprints corresponding to the set of passing test cases directly correspond to line(s) of source code that are causing the fault. An indication of the line(s) of source code corresponding to such breakpoints may be outputted via a user interface, for example, to enable the specific lines of code causing the fault to be identified and modified to correct the fault.

Example embodiments of the invention provide various technical effects over conventional regression testing methodologies. In particular, example embodiments of the invention provide the technical effect of identifying specific components of a SUT (e.g., specific lines of source code) that are contributing to a fault by evaluating test fingerprints corresponding to failing regression test cases against test fingerprints corresponding to passing test cases. This technical effect enables the specific lines of source code that are causing a fault to be identified and then modified, thereby completely automating the debugging process and substantially increasing the efficiency with which faults/errors are identified and corrected, and thus, representing an improvement to computer-based regression testing technology. The above-mentioned technical effect is achieved at least in part by various technical features of example embodiments of the invention including, without limitation, test fingerprint generation; storage of test fingerprints in association with attribute seeds of test cases in a translation table; fault localization and inverse combinatorics to expand out a set of test cases around a selected failing test case to determine a particular combination of attribute values that is contributing to a fault; generation of a regression bucket of failing test cases, each of which includes the particular combination of attribute values; and evaluation of breakpoint encounters embodied in test fingerprints corresponding to the failing test cases against breakpoint encountered in test fingerprints corresponding to passing test cases to identify breakpoints that are encountered during execution of failing test cases(s) but not encountered during execution of any of the passing test cases.

An illustrative method in accordance with example embodiments of the invention and corresponding data structures (e.g., program modules, engines, etc.) for performing the method will now be described. It should be noted that each operation of the method 200 depicted in FIG. 2 may be performed by one or more of the program modules or the like depicted in FIG. 1 or FIG. 3, whose operation will be described in more detail hereinafter. These program modules may be implemented in any combination of hardware, software, and/or firmware. In certain example embodiments, one or more of these program modules may be implemented, at least in part, as software and/or firmware modules that include computer-executable instructions that when executed by a processing circuit cause one or more operations to be performed. A system or device described herein as being configured to implement example embodiments may include one or more processing circuits, each of which may include one or more processing units or nodes. Computer-executable instructions may include computer-executable program code that when executed by a processing unit may cause input data contained in or referenced by the computer-executable program code to be accessed and processed to yield output data.

Figure 2:
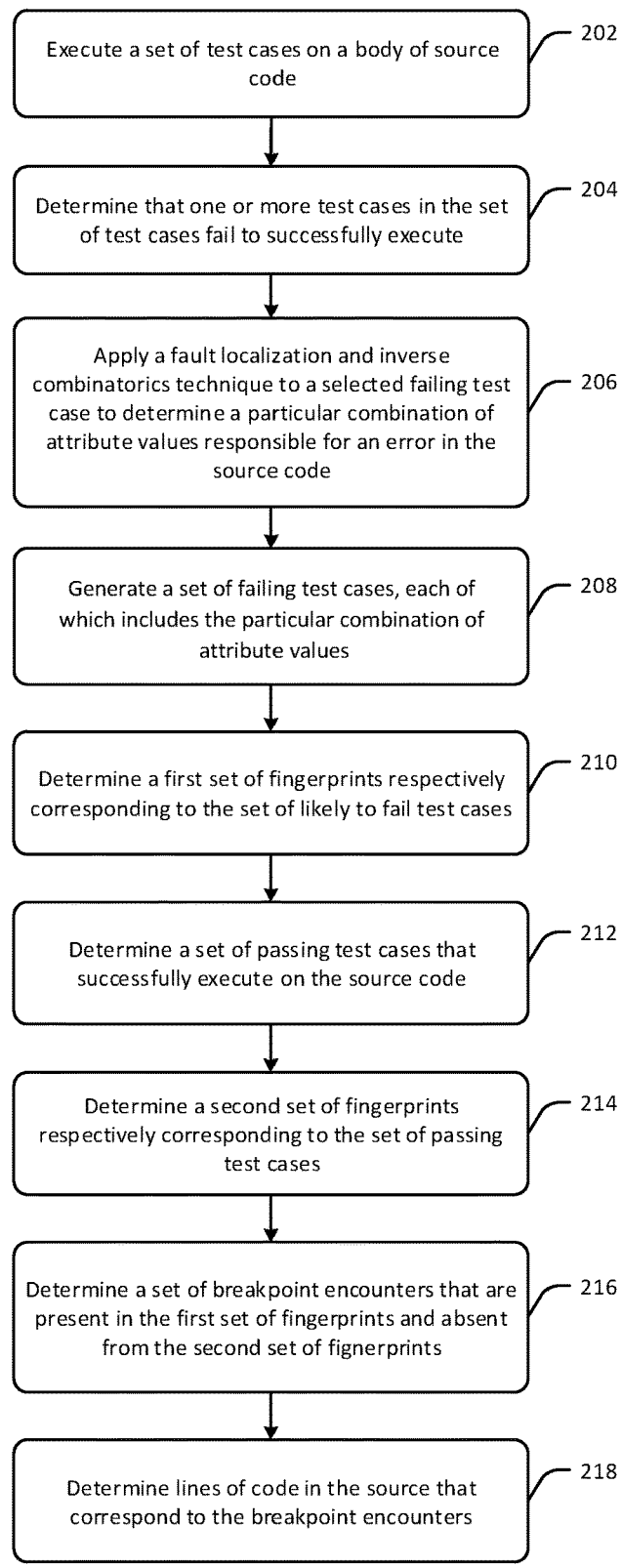
FIG. 2 is a process flow diagram of an illustrative method for utilizing breakpoint value-based fingerprints of failing regression test cases to determine specific lines of source code that are causing a fault in accordance with one or more example embodiments of the invention.

FIG. 1 is a schematic hybrid data flow/block diagram illustrating fault detection utilizing breakpoint value-based fingerprints of failing regression test cases to determine specific lines of source code that are causing a fault in accordance with one or more example embodiments of the invention. FIG. 2 is a process flow diagram of an illustrative method 200 for utilizing breakpoint value-based fingerprints of failing regression test cases to determine specific lines of source code that are causing a fault FIG. 2 will be described in conjunction with FIG. 1 hereinafter.

Referring now to FIG. 2 in conjunction with FIG. 1, at block 202 of the method 200, a set of test cases 100 may be executed by a test execution engine 102. In example embodiments, computer-executable instructions of a test case selection engine 104 may be executed to select the test cases 100 from a set of CTD test cases 108 stored in one or more datastore(s) 106. The selected test cases 100 may then be provided to the test execution engine 102 for execution. Each CTD test case may have been generated from a corresponding CTD test vector representative of a particular combination of attribute values to be tested on a SUT such as a body of source code 110. In certain example embodiments, the set of CTD test cases 108 may provide complete coverage of an entire test space, that is, all possible combinations of attribute values. However, given that this may be an astronomically large number of test cases, the set of test cases 100 selected for execution may be a reduced set of test cases that provides complete n-wise coverage of a test space but only partial higher-order coverage.

While not explicitly depicted as part of the illustrative method 200, it should be appreciated that, in example embodiments, computer-executable instructions of one or more fingerprint generation modules 120 may be executed to generate test fingerprints 122 corresponding to the selected test cases 100 during execution of the test cases 100. In particular, as described earlier, for each selected test case 100 that is executed, a corresponding code path traversed during execution may be determined. A collection of breakpoints encountered during traversal of the code path may then be determined and a test fingerprint 122 may be generated that is indicative of the breakpoints encountered and the number of times each such breakpoint is encountered during execution of the test case, and potentially, an order of the breakpoint encounters. The test fingerprints 122 thus generated may be stored in association with attribute seeds 124 indicative of the combinations of attribute values tested by the corresponding test cases 100. More specifically, computer-executable instructions of one or more translation table modules 126 may be executed to populate a translation table 128 with entries that store the attribute seeds 124 in association with the test fingerprints 122.

Referring again to FIG. 2, at block 204 of the method 200, computer-executable instructions of the test execution engine 102 may be executed to determine that one or more test cases in the set of test cases that failed to successfully execute. Then, at block 206 of the method 200, computer-executable instructions of a fault localization and inverse CTD engine 114 may be executed to select a particular failing test case 112 from the one or more test cases that fail execution, and as described earlier, apply a fault localization and inverse combinatorics technique on the selected particular failing test case 112 to determine a particular combination of attribute values that are responsible for an error/fault during code execution. As previously described, in example embodiments, this is achieved by generating a respective new test case with respect to each attribute in the selected particular failing test case 112 by changing the attribute value of the attribute to an attribute value for that attribute that is not present in any other failing test case and leaving unchanged the respective attribute value for each other attribute. This expanded new set of test cases is then executed. Those new test case(s) that yield a successful execution result may then be assessed to detect and localize the error. In particular, the specific combination of attribute values that are causing the error may be identified based on those new test cases that successfully execute.

Then, at block 208 of the method 200, computer-executable instructions of the fault localization and inverse CTD engine 114 may be executed to generate a localized set of potentially failing test cases 116 based on the error-producing combination of attribute values. In addition, every possible combination of attribute values that include the particular combination of attribute values determined to cause the error may be determined and a regression bucket of all corresponding potentially failing test cases 117 for testing each such combination of attribute values may be generated.

At block 210 of the method 200, computer-executable instructions of one or more fingerprint comparison module(s) 130 may be executed to determine a first set of test fingerprints respectively corresponding to the set of potentially failing test cases 116. In certain example embodiments, all fingerprints corresponding to the set of potentially failing test cases 116 may have been previously generated during prior regression runs and may be accessible via the translation table 128. In other example embodiments, one or more of the potentially failing test cases 116 may need to be executed by the test execution engine 102 to determine the code paths traversed during execution, generate the corresponding test fingerprints, and store them in the translation table 128 in association with corresponding attribute seeds of the test cases.

At block 212 of the method 200, computer-executable instructions of the test case selection engine 104 may be executed to determine a set of passing test cases 118 that successfully execute on the source code 110. In example embodiments, the set of passing test cases 118 may be selected from the set of test cases 100 initially selected for execution and/or from other CTD test cases 108 that have been executed during prior regression runs and that are known to have successfully executed. Then, at block 214 of the method 200, computer-executable instructions of the fingerprint comparison module(s) 130 may be executed to determine a second set of fingerprints respectively corresponding to the set of passing test cases 118. The second set of fingerprints may have been generated during execution of the passing test cases 118 and may be accessed via the translation table 128.

At block 216 of the method 200, computer-executable instructions of the fingerprint comparison module(s) 130 may be executed to compare the first set of fingerprints to the second set of fingerprints to determine a set of one or more breakpoint encounters 132 that are present in at least one fingerprint in the first set of fingerprints and not present in any of the second set of fingerprints. In example embodiments, this determination may be made by first evaluating each fingerprint in the first set of fingerprints to determine a corresponding collection of breakpoint encounters embodied in each such fingerprint. Each fingerprint in the second set of fingerprints may then be similarly deconstructed to determine a corresponding collection of breakpoints embodied therein. The respective collection of breakpoints embodied in each fingerprint corresponding to a failing test case 116 may then be compared to each respective collection of breakpoints corresponding to a passing test case 118 to identify one or more breakpoints 132 that are encountered during execution of at least one failing test case (as reflected in corresponding test fingerprint(s)) and that are not encountered during execution of any of the passing test cases.

Finally, at block 218 of the method 200, in example embodiments, computer-executable instructions of one or more breakpoint correspondence determination modules 134 may be executed to determine lines 136 of the source code 110 that correspond to the breakpoints 132. In example embodiments, a breakpoint 132 that is encountered during execution of at least one failing test case 116 and which is not encountered during execution of any passing test case 118 corresponds to one or more lines of source code 136 that are executed in at least one failing test case scenario but not executed in any passing test case scenario. In particular, the lines of source code corresponding to particular breakpoints may be determined based on a predefined association there between. As such, in example embodiments, the breakpoint(s) 132 present in at least one fingerprint in the first set of fingerprints corresponding to the set of failing test cases 112 and absent from any fingerprint in the second set of fingerprints corresponding to the set of passing test cases 118 directly correspond to line(s) of source code 136 that are causing the fault. An indication of the line(s) of source code 136 corresponding to such breakpoints 132 may be outputted via a user interface, for example, to enable the specific lines of code 136 causing the fault to be identified and modified to correct the fault.

One or more illustrative embodiments of the invention are described herein. Such embodiments are merely illustrative of the scope of this invention and are not intended to be limiting in any way. Accordingly, variations, modifications, and equivalents of embodiments disclosed herein are also within the scope of this invention.

Figure 3:
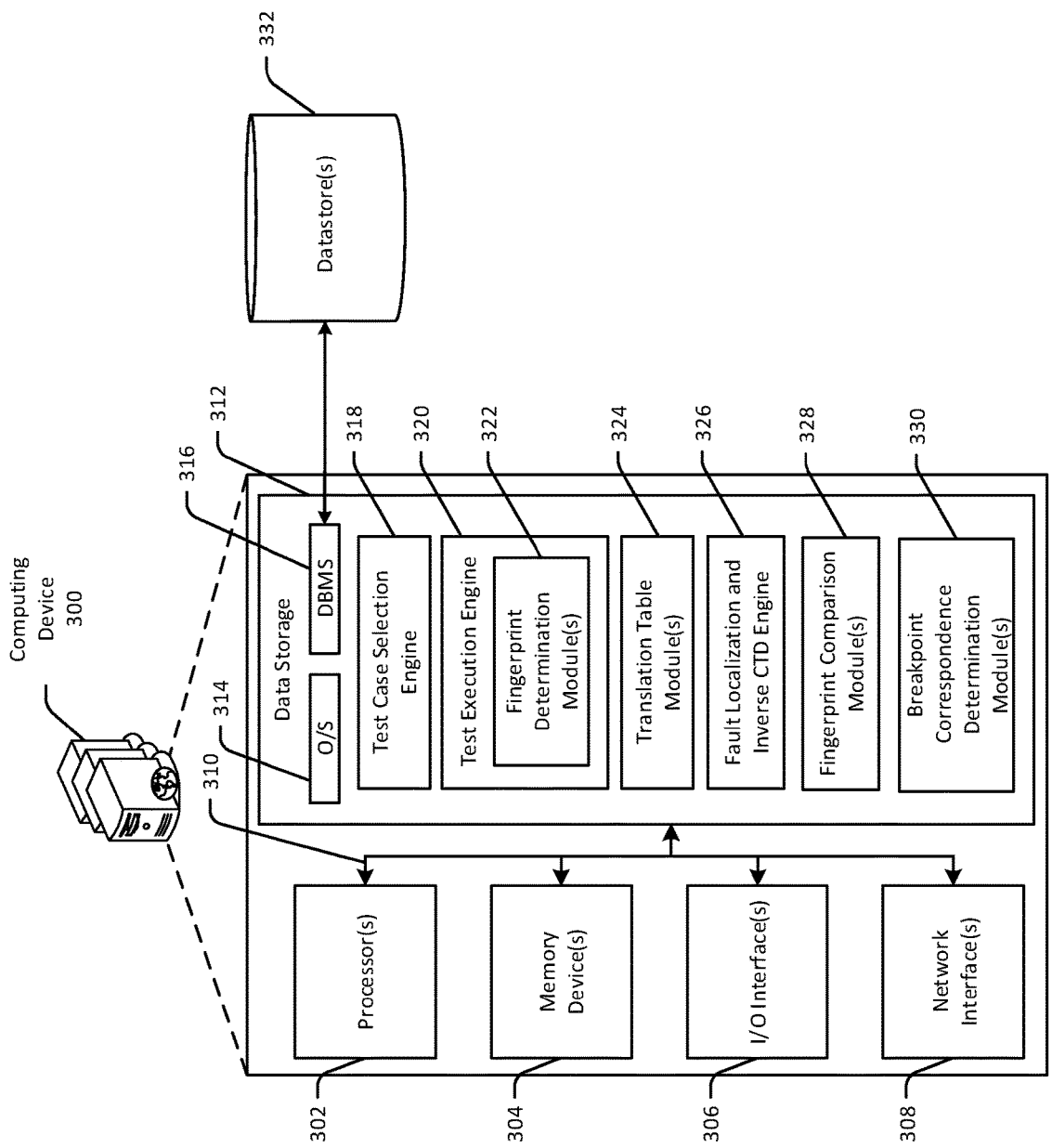
FIG. 3 is a schematic diagram of an illustrative computing device configured to implement one or more example embodiments of the invention.

FIG. 3 is a schematic diagram of an illustrative computing device 300 configured to implement one or more example embodiments of the invention. The illustrative computing device 300 may include a server or collection of servers; a personal computer; a handheld device; or the like. While the computing device 300 and/or any particular component of the computing device 300 may be described herein in the singular, it should be appreciated that multiple instances of the computing device 300 and/or any component thereof may be provided and functionality described in connection with the computing device 300 may be distributed across multiple computing devices 300 and/or across multiple instances of any particular component of the computing device 300.

In an illustrative configuration, the computing device 300 may include one or more processors (processor(s)) 302, one or more memory devices 304 (generically referred to herein as memory 304), one or more input/output ("I/O") interfaces 306, one or more network interfaces 308, and data storage 312. The computing device 300 may further include one or more buses 310 that functionally couple various components of the computing device 300.

The bus(es) 310 may include at least one of a system bus, a memory bus, an address bus, or a message bus, and may permit the exchange of information (e.g., data (including computer-executable code), signaling, etc.) between various components of the computing device 300. The bus(es) 310 may include, without limitation, a memory bus or a memory controller, a peripheral bus, an accelerated graphics port, and so forth. The bus(es) 310 may be associated with any suitable bus architecture including, without limitation, an Industry Standard Architecture (ISA), a Micro Channel Architecture (MCA), an Enhanced ISA (EISA), a Video Electronics Standards Association (VESA) architecture, an Accelerated Graphics Port (AGP) architecture, a Peripheral Component Interconnects (PCI) architecture, a PCI-Express architecture, a Personal Computer Memory Card International Association (PCMCIA) architecture, a Universal Serial Bus (USB) architecture, and so forth.

The memory 304 may include volatile memory (memory that maintains its state when supplied with power) such as random access memory (RAM) and/or non-volatile memory (memory that maintains its state even when not supplied with power) such as read-only memory (ROM), flash memory, ferroelectric RAM (FRAM), and so forth. Persistent data storage, as that term is used herein, may include non-volatile memory. In certain example embodiments, volatile memory may enable faster read/write access than non-volatile memory. However, in certain other example embodiments, certain types of non-volatile memory (e.g., FRAM) may enable faster read/write access than certain types of volatile memory.

In various implementations, the memory 304 may include multiple different types of memory such as various types of static random access memory (SRAM), various types of dynamic random access memory (DRAM), various types of unalterable ROM, and/or writeable variants of ROM such as electrically erasable programmable read-only memory (EEPROM), flash memory, and so forth. The memory 304 may include main memory as well as various forms of cache memory such as instruction cache(s), data cache(s), translation lookaside buffer(s) (TLBs), and so forth. Further, cache memory such as a data cache may be a multi-level cache organized as a hierarchy of one or more cache levels (L1, L2, etc.).

The data storage 312 may include removable storage and/or non-removable storage including, but not limited to, magnetic storage, optical disk storage, and/or tape storage. The data storage 312 may provide non-volatile storage of computer-executable instructions and other data. The memory 304 and the data storage 312, removable and/or non-removable, are examples of computer-readable storage media (CRSM) as that term is used herein.

The data storage 312 may store computer-executable code, instructions, or the like that may be loadable into the memory 304 and executable by the processor(s) 302 to cause the processor(s) 302 to perform or initiate various operations. The data storage 312 may additionally store data that may be copied to memory 304 for use by the processor(s) 302 during the execution of the computer-executable instructions. Moreover, output data generated as a result of execution of the computer-executable instructions by the processor(s) 302 may be stored initially in memory 304 and may ultimately be copied to data storage 312 for non-volatile storage.

More specifically, the data storage 312 may store one or more operating systems (O/S) 314; one or more database management systems (DBMS) 316 configured to access the memory 304 and/or one or more external datastores 332; and one or more program modules, applications, engines, managers, computer-executable code, scripts, or the like such as, for example, a test case selection engine 318; a test execution engine 320, which may include one or more sub-modules such as one or more fingerprint determination modules 322; one or more translation table modules 324; a fault localization and inverse CTD engine 326; one or more fingerprint comparison modules 328; and one or more breakpoint correspondence determination modules 330. Any of the components depicted as being stored in data storage 312 may include any combination of software, firmware, and/or hardware. The software and/or firmware may include computer-executable instructions (e.g., computer-executable program code) that may be loaded into the memory 304 for execution by one or more of the processor(s) 302 to perform any of the operations described earlier in connection with correspondingly named modules/engines depicted in FIG. 1.

Although not depicted in FIG. 3, the data storage 312 may further store various types of data utilized by components of the computing device 300 (e.g., data stored in the datastore(s) 332). Any data stored in the data storage 312 may be loaded into the memory 304 for use by the processor(s) 302 in executing computer-executable instructions. In addition, any data stored in the data storage 312 may potentially be stored in the external datastore(s) 332 and may be accessed via the DBMS 316 and loaded in the memory 304 for use by the processor(s) 302 in executing computer-executable instructions.

The processor(s) 302 may be configured to access the memory 304 and execute computer-executable instructions loaded therein. For example, the processor(s) 302 may be configured to execute computer-executable instructions of the various program modules, applications, engines, managers, or the like of the computing device 300 to cause or facilitate various operations to be performed in accordance with one or more embodiments of the invention. The processor(s) 302 may include any suitable processing unit capable of accepting data as input, processing the input data in accordance with stored computer-executable instructions, and generating output data. The processor(s) 302 may include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), a digital signal processor (DSP), and so forth. Further, the processor(s) 302 may have any suitable microarchitecture design that includes any number of constituent components such as, for example, registers, multiplexers, arithmetic logic units, cache controllers for controlling read/write operations to cache memory, branch predictors, or the like. The microarchitecture design of the processor(s) 302 may be capable of supporting any of a variety of instruction sets.

Referring now to other illustrative components depicted as being stored in the data storage 312, the O/S 314 may be loaded from the data storage 312 into the memory 304 and may provide an interface between other application software executing on the computing device 300 and hardware resources of the computing device 300. More specifically, the O/S 314 may include a set of computer-executable instructions for managing hardware resources of the computing device 300 and for providing common services to other application programs. In certain example embodiments, the O/S 314 may include or otherwise control the execution of one or more of the program modules, engines, managers, or the like depicted as being stored in the data storage 312. The O/S 314 may include any operating system now known or which may be developed in the future including, but not limited to, any server operating system, any mainframe operating system, or any other proprietary or non-proprietary operating system.

The DBMS 316 may be loaded into the memory 304 and may support functionality for accessing, retrieving, storing, and/or manipulating data stored in the memory 304, data stored in the data storage 312, and/or data stored in external datastore(s) 332. The DBMS 316 may use any of a variety of database models (e.g., relational model, object model, etc.) and may support any of a variety of query languages. The DBMS 316 may access data represented in one or more data schemas and stored in any suitable data repository. Data stored in the datastore(s) 332 may include, for example, breakpoint values; fingerprints; source code; regression tests; attribute seeds; translation table entries; and so forth, any portion of which may alternatively or additionally be stored in the data storage 312. External datastore(s) 332 that may be accessible by the computing device 300 via the DBMS 316 may include, but are not limited to, databases (e.g., relational, object-oriented, etc.), file systems, flat files, distributed datastores in which data is stored on more than one node of a computer network, peer-to-peer network datastores, or the like. In example embodiments, the datastore(s) 332 may include the datastore(s) 106 depicted in FIG. 1.

Referring now to other illustrative components of the computing device 300, the input/output (I/O) interface(s) 306 may facilitate the receipt of input information by the computing device 300 from one or more I/O devices as well as the output of information from the computing device 300 to the one or more I/O devices. The I/O devices may include any of a variety of components such as a display or display screen having a touch surface or touchscreen; an audio output device for producing sound, such as a speaker; an audio capture device, such as a microphone; an image and/or video capture device, such as a camera; a haptic unit; and so forth. Any of these components may be integrated into the computing device 300 or may be separate. The I/O devices may further include, for example, any number of peripheral devices such as data storage devices, printing devices, and so forth.

The I/O interface(s) 306 may also include an interface for an external peripheral device connection such as universal serial bus (USB), FireWire, Thunderbolt, Ethernet port or other connection protocol that may connect to one or more networks. The I/O interface(s) 306 may also include a connection to one or more antennas to connect to one or more networks via a wireless local area network (WLAN) (such as Wi-Fi) radio, Bluetooth, and/or a wireless network radio, such as a radio capable of communication with a wireless communication network such as a Long Term Evolution (LTE) network, WiMAX network, 3G network, etc.

The computing device 300 may further include one or more network interfaces 308 via which the computing device 300 may communicate with any of a variety of other systems, platforms, networks, devices, and so forth. The network interface(s) 308 may enable communication, for example, with one or more other devices via one or more of networks. Such network(s) may include, but are not limited to, any one or more different types of communications networks such as, for example, cable networks, public networks (e.g., the Internet), private networks (e.g., frame-relay networks), wireless networks, cellular networks, telephone networks (e.g., a public switched telephone network), or any other suitable private or public packet-switched or circuit-switched networks. Such network(s) may have any suitable communication range associated therewith and may include, for example, global networks (e.g., the Internet), metropolitan area networks (MANs), wide area networks (WANs), local area networks (LANs), or personal area networks (PANs). In addition, such network(s) may include communication links and associated networking devices (e.g., link-layer switches, routers, etc.) for transmitting network traffic over any suitable type of medium including, but not limited to, coaxial cable, twisted-pair wire (e.g., twisted-pair copper wire), optical fiber, a hybrid fiber-coaxial (HFC) medium, a microwave medium, a radio frequency communication medium, a satellite communication medium, or any combination thereof.

It should be appreciated that the program modules/engines depicted in FIG. 3 as being stored in the data storage 312 are merely illustrative and not exhaustive and that processing described as being supported by any particular module may alternatively be distributed across multiple modules, engines, or the like, or performed by a different module, engine, or the like. In addition, various program module(s), script(s), plug-in(s), Application Programming Interface(s) (API(s)), or any other suitable computer-executable code hosted locally on the computing device 300 and/or other computing devices may be provided to support functionality provided by the modules depicted in FIG. 3 and/or additional or alternate functionality. Further, functionality may be modularized in any suitable manner such that processing described as being performed by a particular module may be performed by a collection of any number of program modules, or functionality described as being supported by any particular module may be supported, at least in part, by another module. In addition, program modules that support the functionality described herein may be executable across any number of cluster members in accordance with any suitable computing model such as, for example, a client-server model, a peer-to-peer model, and so forth. In addition, any of the functionality described as being supported by any of the modules depicted in FIG. 3 may be implemented, at least partially, in hardware and/or firmware across any number of devices.

It should further be appreciated that the computing device 300 may include alternate and/or additional hardware, software, or firmware components beyond those described or depicted without departing from the scope of the invention. More particularly, it should be appreciated that software, firmware, or hardware components depicted as forming part of the computing device 300 are merely illustrative and that some components may not be present or additional components may be provided in various embodiments. While various illustrative modules have been depicted and described as software modules stored in data storage 312, it should be appreciated that functionality described as being supported by the modules may be enabled by any combination of hardware, software, and/or firmware. It should further be appreciated that each of the above-mentioned modules may, in various embodiments, represent a logical partitioning of supported functionality. This logical partitioning is depicted for ease of explanation of the functionality and may not be representative of the structure of software, hardware, and/or firmware for implementing the functionality. Accordingly, it should be appreciated that functionality described as being provided by a particular module may, in various embodiments, be provided at least in part by one or more other modules. Further, one or more depicted modules may not be present in certain embodiments, while in other embodiments, additional program modules and/or engines not depicted may be present and may support at least a portion of the described functionality and/or additional functionality.

One or more operations of the method 200 may be performed by one or more computing devices 300 having the illustrative configuration depicted in FIG. 3, or more specifically, by one or more program modules, engines, applications, or the like executable on such a device. It should be appreciated, however, that such operations may be implemented in connection with numerous other device configurations.

The operations described and depicted in the illustrative method of FIG. 2 may be carried out or performed in any suitable order as desired in various example embodiments of the invention. Additionally, in certain example embodiments, at least a portion of the operations may be carried out in parallel. Furthermore, in certain example embodiments, less, more, or different operations than those depicted in FIG. 2 may be performed.

Although specific embodiments of the invention have been described, one of ordinary skill in the art will recognize that numerous other modifications and alternative embodiments are within the scope of the invention. For example, any of the functionality and/or processing capabilities described with respect to a particular system, system component, device, or device component may be performed by any other system, device, or component. Further, while various illustrative implementations and architectures have been described in accordance with embodiments of the invention, one of ordinary skill in the art will appreciate that numerous other modifications to the illustrative implementations and architectures described herein are also within the scope of this invention. In addition, it should be appreciated that any operation, element, component, data, or the like described herein as being based on another operation, element, component, data, or the like may be additionally based on one or more other operations, elements, components, data, or the like. Accordingly, the phrase "based on," or variants thereof, should be interpreted as "based at least in part on."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method for performing fault detection, the method comprising:
    executing a set of test cases on source code;
    determining that one or more test cases in the set of test cases fail to successfully execute;
    selecting a particular failing test case from the one or more test cases that fail to successfully execute;
    generating, automatically, a set of failing test cases based on the particular failing test case by creating a respective new test case with respect to each attribute in the particular failing test case;
    determining a first set of fingerprints respectively corresponding respectively to the set of failing test cases;
    determining a second set of fingerprints respectively corresponding respectively to a set of passing test cases that successfully execute on the source code;
    storing, in a data structure, the first set of fingerprints and the second set of fingerprints, wherein a fingerprint of a test case represents a set of breakpoints encountered by the test case;
    determining, based at least in part on a comparison of the first set of fingerprints to the second set of fingerprints, one or more lines of the source code that are contributing to a fault, wherein determining the one or more lines of the source code that are contributing to the fault comprises:
        determining a set of breakpoint encounters that are present in the first set of fingerprints and absent from the second set of fingerprints; and
        determining the one or more lines of the source code based at least in part on a correspondence between the one or more lines of the source code and the set of breakpoint encounters.

2. The computer-implemented method of claim 1, further comprising presenting, via a user interface, an indication of the one or more lines of the source code.

3. The computer-implemented method of claim 1, wherein determining the set of breakpoint encounters comprises:
    determining a value contained in a particular fingerprint in the first set of fingerprints, wherein the value is stored at an index in the particular fingerprint that corresponds to a particular breakpoint in the source code;
    determining that the value indicates that the particular breakpoint is encountered at least once during execution of the particular failing test case that corresponds to the particular fingerprint; and
    determining that no fingerprint in the second set of fingerprints includes any value that indicates that the particular breakpoint is encountered during execution of any passing test case.

4. The computer-implemented method of claim 3, wherein determining the one or more lines of the source code based at least in part on the correspondence between the one or more lines of the source code and the set of breakpoint encounters comprises determining a particular line of the source code that corresponds to the particular breakpoint.

5. The computer-implemented method of claim 1, further comprising:
    executing the set of failing test cases on the source code;
    determining a respective code path traversed by each test case of the set of failing test cases; and
    determining, based at least in part on each respective code path, a respective fingerprint in the first set of fingerprints.

6. The computer-implemented method of claim 1, wherein generating the set of failing test cases from the particular failing test case comprises:
    determining a particular combination of attribute values causing the particular failing test case to fail to successfully execute;
    determining a set of test vectors, wherein each test vector includes the particular combination of attribute values and a respective one or more additional attribute values; and
    generating the set of failing test cases from the set of test vectors.

7. The computer-implemented method of claim 1, wherein the data structure is a character string, wherein each character in the character string represents a corresponding breakpoint and the ordering of characters in the character string represents an order in which breakpoints are encountered during execution of the test case.

8. The computer-implemented method of claim 1, wherein the data structure is a table, wherein each translation table entry stores an attribute seed of a corresponding test case in association with the fingerprint for the test case.

9. The computer-implemented method of claim 8, wherein the attribute seed is a representation of combination of attribute values tested by the test case.

10. A system for performing fault detection, the system comprising:
    at least one processor; and
    at least one memory storing computer-executable instructions, wherein the at least one processor is configured to access the at least one memory and execute the computer-executable instructions to:
        execute a set of test cases on source code;
        determine that one or more test cases in the set of test cases fail to successfully execute;
        select a particular failing test case from the one or more test cases that fail to successfully execute;
        generate a set of failing cases based on the particular failing test case by creating a respective new test case with respect to each attribute in the particular failing test case;
        determine a first set of fingerprints respectively corresponding to the set of failing test cases;

determine a second set of fingerprints respectively corresponding to a set of passing test cases that successfully execute on the source code;

storing, in a data structure, the first set of fingerprints and the second set of fingerprints, wherein a fingerprint of a test case represents a set of breakpoints encountered by the test case;

determine, based at least in part on a comparison of the first set of fingerprints to the second set of fingerprints, one or more lines of the source code that are contributing to a fault, wherein determining the one or more lines of the source code that are contributing to the fault comprises:

determining a set of breakpoint encounters that are present in the first set of fingerprints and absent from the second set of fingerprints; and determining the one or more lines of the source code based at least in part on a correspondence between the one or more lines of the source code and the set of breakpoint encounters.

11. The system of claim 10, wherein the at least one processor is further configured to execute the computer-executable instructions to present, via a user interface, an indication of the one or more lines of the source code.

12. The system of claim 10, wherein the at least one processor is configured to determine the set of breakpoint encounters by executing the computer-executable instructions to:

determine a value contained in a particular fingerprint in the first set of fingerprints, wherein the value is stored at an index in the particular fingerprint that corresponds to a particular breakpoint in the source code;

determine that the value indicates that the particular breakpoint is encountered at least once during execution of the particular failing test case that corresponds to the particular fingerprint; and determine that no fingerprint in the second set of fingerprints includes any value that indicates that the particular breakpoint is encountered during execution of any passing test case.

13. The system of claim 12, wherein the at least one processor is configured to determine the one or more lines of the source code based at least in part on the correspondence between the one or more lines of the source code and the set of breakpoint encounters by executing the computer-executable instructions to determine a particular line of the source code that corresponds to the particular breakpoint.

14. The system of claim 10, wherein the at least one processor is further configured to execute the computer-executable instructions to:

execute the set of failing test cases on the source code;

determine a respective code path traversed by each test case of the set of failing test cases; and determine, based at least in part on each respective code path, a respective fingerprint in the first set of fingerprints.

15. The system of claim 10, wherein the at least one processor is configured to generate the set of failing test cases from the particular failing test case by executing the computer-executable instructions to:

determine a particular combination of attribute values causing the particular failing test case to fail to successfully execute;

determine a set of test vectors, wherein each test vector includes the particular combination of attribute values and a respective one or more additional attribute values; and generate the set of failing test cases from the set of test vectors.

16. A computer program product for performing fault detection, the computer program product comprising a computer readable storage medium having program instructions embodied therewith, the program instructions readable by a processing circuit to cause the processing circuit to perform a method comprising:

executing a set of test cases on source code;

determining that one or more test cases in the set of test cases fail to successfully execute;

selecting a particular failing test case from the one or more test cases that fail to successfully execute;

generating a set of failing test cases based on the particular failing test case by creating a respective new test case with respect to each attribute in the particular failing test case;

determining a first set of fingerprints respectively corresponding to the set of failing test cases;

determining a second set of fingerprints respectively corresponding to a set of passing test cases that successfully execute on the source code;

storing, in a data structure, the first set of fingerprints and the second set of fingerprints, wherein a fingerprint of a test case represents a set of breakpoints encountered by the test case;

determining, based at least in part on a comparison of the first set of fingerprints to the second set of fingerprints, one or more lines of the source code that are contributing to a fault, wherein determining the one or more lines of the source code that are contributing to the fault comprises:

determining a set of breakpoint encounters that are present in the first set of fingerprints and absent from the second set of fingerprints; and determining the one or more lines of the source code based at least in part on a correspondence between the one or more lines of the source code and the set of breakpoint encounters.

17. The computer program product of claim 16, the method further comprising presenting, via a user interface, an indication of the one or more lines of the source code.

18. The computer program product of claim 16, wherein determining the set of breakpoint encounters comprises:

determining a value contained in a particular fingerprint in the first set of fingerprints, wherein the value is stored at an index in the particular fingerprint that corresponds to a particular breakpoint in the source code;

determining that the value indicates that the particular breakpoint is encountered at least once during execution of the particular failing test case that corresponds to the particular fingerprint; and determining that no fingerprint in the second set of fingerprints includes any value that indicates that the particular breakpoint is encountered during execution of any passing test case.

19. The computer program product of claim 18, wherein determining the one or more lines of the source code based at least in part on the correspondence between the one or more lines of the source code and the set of breakpoint encounters comprises determining a particular line of the source code that corresponds to the particular breakpoint.

20. The computer program product of claim 16, the method further comprising:

executing the set of failing test cases on the source code;

determining a respective code path traversed by each test case of the set of failing test cases; and determining, based at least in part on each respective code path, a respective fingerprint in the first set of fingerprints.

\* \* \* \* \*